United States Patent
Tang et al.

(10) Patent No.: US 8,458,641 B2
(45) Date of Patent: Jun. 4, 2013

(54) METHOD, SYSTEM, AND DESIGN STRUCTURE FOR MAKING VOLTAGE ENVIRONMENT CONSISTENT FOR REUSED SUB MODULES IN CHIP DESIGN

(75) Inventors: Xiao Feng Tang, Shanghai (CN); Chen Xu, Shanghai (CN); Jia Lian Tang, Shanghai (CN); Xia Li, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 13/031,754

(22) Filed: Feb. 22, 2011

(65) Prior Publication Data

US 2011/0246959 A1    Oct. 6, 2011

(30) Foreign Application Priority Data

Mar. 31, 2010   (CN) .......................... 2010 1 0139118

(51) Int. Cl.
*G06F 17/50* (2006.01)

(52) U.S. Cl.
USPC ............................. 716/132; 716/119; 716/126

(58) Field of Classification Search
USPC .......................................... 716/119, 126, 132
See application file for complete search history.

(56) References Cited

U.S. PATENT DOCUMENTS

| | | | | |
|---|---|---|---|---|
| 5,155,390 A | * | 10/1992 | Hickman et al. ................. | 326/41 |
| 6,002,857 A | * | 12/1999 | Ramachandran ............. | 716/122 |
| 6,446,245 B1 | * | 9/2002 | Xing et al. ..................... | 716/120 |
| 6,675,361 B1 | * | 1/2004 | Crafts ........................... | 438/129 |
| 6,701,509 B2 | * | 3/2004 | Aggarwal et al. ............. | 716/120 |
| 6,829,754 B1 | * | 12/2004 | Yu et al. ........................ | 716/106 |
| 7,418,683 B1 | * | 8/2008 | Sonnard et al. ................ | 716/122 |
| 2001/0049813 A1 | * | 12/2001 | Chan et al. ........................ | 716/8 |
| 2002/0087940 A1 | * | 7/2002 | Greidinger et al. ............... | 716/2 |
| 2002/0125897 A1 | | 9/2002 | Frech et al. | |
| 2005/0172252 A1 | * | 8/2005 | Cheng et al. .................... | 716/10 |
| 2006/0080630 A1 | * | 4/2006 | Lin ................................. | 716/11 |

FOREIGN PATENT DOCUMENTS

CN            101470762 A         7/2009

OTHER PUBLICATIONS

Information Materials for IDS dated Sep. 6, 2012, prepared by Jiang Tao; SIPO Office Action dated Aug. 31, 2012.

\* cited by examiner

*Primary Examiner* — Thuan Do
(74) *Attorney, Agent, or Firm* — Yuanmin Cai

(57) ABSTRACT

The present invention discloses a method, system, and design structure for making voltage environment consistent for reused sub modules in chip design, wherein each reused sub module is connected to a power grid of the chip through power connection points on a power ring of the sub module, the method including: adjusting numbers and locations of power connection points of a plurality of reused sub modules, such that the numbers of the power connection points and locations of the corresponding power connection points are identical for the plurality of reused sub modules; adjusting power wires of the plurality of reused sub modules on the power grid which are connected the power connection points, such that voltages at the corresponding power connection points are consistent for the plurality of reused sub modules. The present invention may reduce timing variation of reused sub modules in chip design and finally achieve an objective of reducing design complexity and work load and shortening the design period.

24 Claims, 5 Drawing Sheets

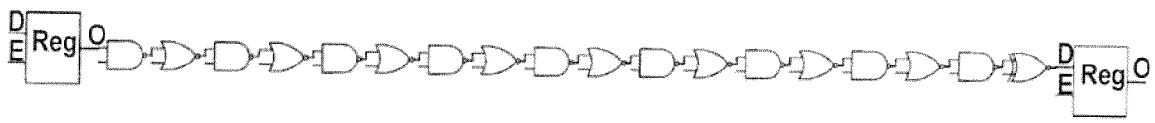

Fig. 3

Adjust numbers and locations of power connection points of the plurality of reused sub modules, such that the numbers of the power connection points and the locations of the corresponding power connection points are identical for the plurality of reused sub modules (S401)

Adjust power wires of the plurality of reused sub modules on the power grid, which are connected to the power connection points, such that voltages at the corresponding power connection points are consistent for the plurality of reused sub modules (S402)

Fig. 4

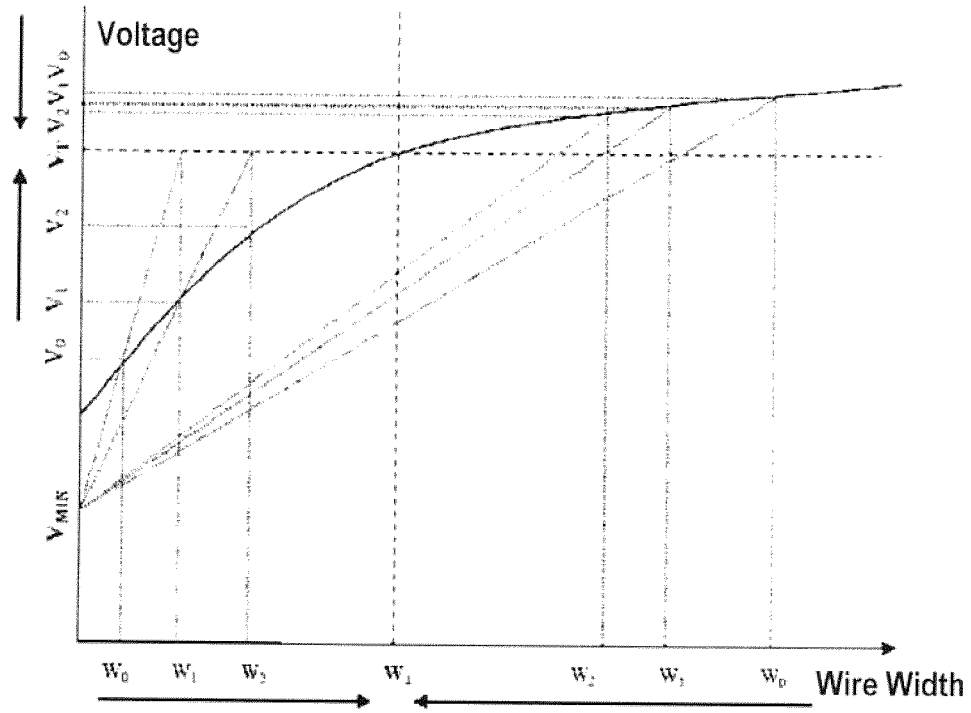

Fig. 5

METHOD, SYSTEM, AND DESIGN STRUCTURE FOR MAKING VOLTAGE ENVIRONMENT CONSISTENT FOR REUSED SUB MODULES IN CHIP DESIGN

CROSS REFERENCE TO RELATED APPLICATION

The present application claims the benefit of priority of a Chinese Patent Application Serial Number 201010139118.4, entitled "Method, System, And Design Structure For Making Voltage Environment Consistent For Reused Sub Modules In Chip Design", filed Mar. 31, 2010 with the State Intellectual Property Office (SIPO) of the People's Republic of China, the content of which is incorporated herein by reference in its entirety.

FIELD OF INVENTION

Embodiments of the present invention generally relate to chip design and more particularly relate to method, system, and design structure for making voltage environment consistent for reused sub modules in designing a chip.

BACKGROUND

Nowadays designs of an integrated circuit tend to be more complex, coupled with size inflation and increasingly advanced techniques. Hierarchical design is a most common design method for an integrated circuit chip, wherein the chip to be designed will be divided into a plurality of sub modules, each sub module being separately designed and then called by a top level. If, in the design, several sub modules are completely identical, the design of a whole chip is completed with only designing the sub module once and by calling the designed sub module multiple times when designing the top level. Such a sub module is called a reused sub module which can greatly reduce the complexity and work load of design.

However, when a reused sub module is called multiple times by a top level design, the timing variation between respective reused sub modules is always different, which makes the designer have to make repetitive adjustments. To cope with timing variation of a reused sub module, the following methods are usually adopted in the prior art, starting from reducing the timing variation inside the module:

Logical method: in order to reduce timing variation on a data path, typically, a device with a greater drive capability is used so as to reduce logic fan-out and a device with a higher threshold voltage is replaced with one with a lower threshold voltage; and in design, adopted approaches are typically copying/relaying logics, re-synthesis and optimization, etc.

Physical method: in order to make data paths as short as possible, locations of some modules will be adjusted to make them as close as possible, and in design, it is embodied as adjustment of pre-arranged locations; or the number of power capacitors may be increased or decreased so as to reduce the noise of power supply, which is embodied as adjustment of power supply capacity, etc.

However, the above methods not only are time-consuming but also can hardly solve timing variations between reused sub modules. For a complex design, this part of work will account for 10% to 20% of the final stage working time.

SUMMARY

Therefore, a method is needed for reducing timing variation among respective reused sub modules. Through study, inventors of the present invention find that timing variation among respective reused sub modules is mainly caused by different voltage environment for respective reused sub modules. Embodiments of the present invention disclose a method and system for making voltage environment consistent for reused sub modules in an integrated circuit design, which can reduce, by making voltage environment consistent for reused sub modules, timing variation between reused sub modules in chip design such that a designer has a greater flexibility in pre-arrangement, and finally achieve the objectives of reducing design complexity and work load and shortening design period.

According to one aspect of the present invention, there is provided a method for making voltage environment consistent for reused sub modules in design a chip, wherein the chip includes a plurality of reused sub modules, each reused sub module being connected to a power grid of the chip through power connection points on a power ring thereof, the method including:

adjusting numbers and locations of power connection points of the plurality of reused sub modules, such that the numbers of the power connection points and locations of the corresponding power connection points are identical for the plurality of reused sub modules; and adjusting power wires of the plurality of reused sub modules on the power grid which are connected to the power connection points, such that voltages at corresponding power connection points are consistent for the plurality of reused sub modules.

According to another aspect of the present invention, there is provided a system for making voltage environment consistent for reused sub modules in designing a chip, wherein the chip includes a plurality of reused sub modules, each reused sub module being connected to a power grid of the chip through power connection points on a power ring of the sub module, the system including:

power connection point number and location adjustment means for adjusting numbers and locations of power connection points of the plurality of reused sub modules, such that the numbers of the power connection points and locations of the corresponding power connection points are identical for the plurality of reused sub modules; and power wire adjustment means for adjusting power wires of the plurality of reused sub modules on the power grid which are connected to the power connection points, such that voltages at the corresponding power connection points are consistent for the plurality of reused sub modules.

According to a further aspect of the present invention, there is provided a design structure embodied in a computer-readable medium for designing, manufacturing, or testing an integrated circuit, wherein the design structure is designed by using the method of the present invention.

BRIEF DESCRIPTION OF THE DRAWINGS

The above and other objectives, features and advantages of the present invention will become more apparent through more detained description of the exemplary embodiments of the present invention as illustrated in the drawings, wherein like reference signs typically represent the same components in the exemplary embodiments of the present invention.

FIG. 3 illustrates a circuit schematic diagram of a certain data path on a reused sub module;

FIG. 4 illustrates a flow of a method for making voltage environment consistent for reused sub modules in chip design according to an embodiment of the present invention;

FIG. 5 illustrates a curve of a relationship between a width of each power wire segment connected to each power connection point and a voltage of the power connection point;

DETAILED DESCRIPTION OF EMBODIMENTS

Hereinafter, the preferred embodiments of the present invention will be described in more detail with reference to the accompanying drawings which illustrate the preferred embodiments of the present invention. However, the present invention may be implemented in various manners and should not be understood as being limited by the embodiments depicted herein. On the contrary, these embodiments are presented to make the present invention much clearer and more complete and to completely convey the scope of the present invention to the skilled in the art.

Figure 1:
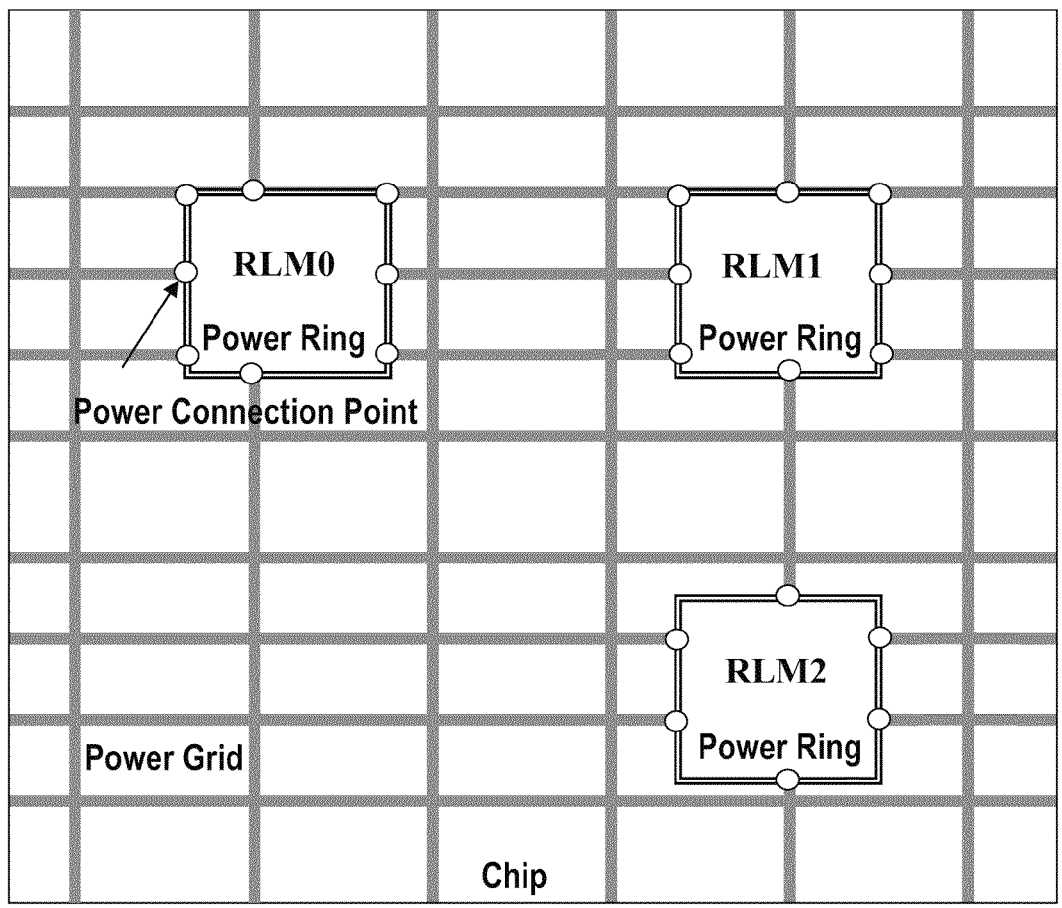
FIG. 1 illustrates an example of three reused sub modules having different environment voltages.

In designing a chip in a hierarchical design approach, each sub module has an independent power ring circling around an edge of the sub module. An external power grid is directly connected to the power ring, while all devices inside the reused sub module are powered by this power ring. When a top level design calls the reused sub modules multiple times, voltage environment of respective sub modules will be different. FIG. 1 illustrates an example of three reused sub modules having different environment voltages, wherein RLM0, RLM1 and RLM 2 are identical reused sub modules; the circle on each sub module represents a connection point between the power grid and the power ring of the module, which is called a power connection point. During an automatic wiring process, due to differences in power grids, the numbers of power connection points of a plurality of reused sub modules are also different and the environment voltages on which respective reused sub modules are switched are also different. Since the environment voltages are different, these three reused sub modules cannot be completely identical as required by the design. For example, due to differences in the power supply voltages, the device delays in respective modules are different.

Figure 2:
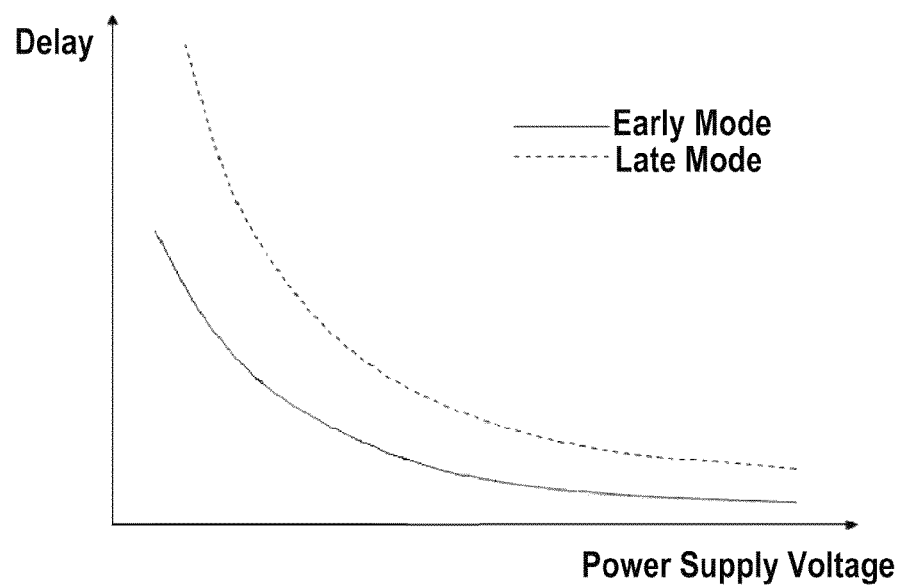
FIG. 2 illustrates a curve of a relationship between a device voltage and a device delay of an inverter based on an RC model.

FIG. 2 illustrates a curve of a relationship between a device voltage and a device delay of an inverter based on an RC model. Due to the variation of manufacturing process, the delay of each device in a circuit is within a range, instead of a definite value. Thus, the early mode in FIG. 2 is also called "early" mode, which means a delay of the device in a "quickest" mode in the manufacturing process while the late mode, also called "late" mode, means a delay of the device in a "slowest" mode in the manufacturing process. It can be seen from FIG. 2 that with increase of the power supply voltage, the delays of the device in the two modes are all monotonically decreased, and the curves are approximate to hyperbolic curves. Such a relationship is also present between device voltage and device delay of other device (for example AND gate, and OR gate). Variation of device delay with power supply voltage results in that if differences exist in the environment voltages of respective reused sub modules, the timing variations of respective reused sub modules are different, thereby causing a barrier to module reuse.

FIG. 3 illustrates a circuit schematic diagram of a data path on a certain reused sub module, wherein data is transmitted from a register at the utmost left and is received by a register at the utmost right after a series of combinational logics in the middle. This circuit operates at a clock of 267 MHz. When the reused sub module is applied to a chip multiple times, on the path of a first reused sub module (RLM1), the arrival time at a data sampling point as calculated by the design tool is 4.112 nanosecond (ns) if an estimate voltage drop of all devices on the path of the first reused sub module is 0.022 v. When the voltage drop of a second reused sub module (RLM2) of the chip is surveyed, it is found that on the path of the second reused sub module, the arrival time at the data sampling point as calculated by the design tool rises from 4.012 ns to 4.319 ns, with a float discrepancy of 300 picoseconds (ps). Such a great discrepancy will cause the timing measurement results between the same reused sub modules at different locations to be greatly different. This requires additional work to optimize the reused sub modules such that they satisfy all timing restrictions in different voltage environment. However, the workload for optimizing reused sub modules is rather heavy.

From the above study, it is found that timing variations of reused sub modules are mainly caused by voltage environment differences of respective reused sub modules. Therefore, the present invention provides a method and a system for making voltage environment consistent for reused sub modules in chip design. This method, by changing the power grid structure surrounding the reused sub modules to maintain voltage environment for reused modules at different locations of the chip to be consistent, enables the timing characteristics inside respective reused sub modules to also maintain consistent, which facilitates timing convergence.

It can be known from the above analysis that as long as consistency between the voltage distributions over power ring of reused sub modules is ensured, the voltage distributions inside the sub modules at different locations can be regarded as consistent. Therefore, FIG. 4 illustrates a flow of a method for making voltage environment consistent for reused sub modules in chip design according to an embodiment of the present invention, wherein the chip comprises a plurality of reused sub modules each being connected to a power grid of the chip through power connection points on a power ring of the sub module, the method comprising:

At step 401, adjusting the number and locations of power connection points of the plurality of reused sub modules such that the number of the power connection points and the locations of the corresponding power connection points are identical for the plurality of reused sub modules and;

At step 402, adjusting power wires of the plurality of reused sub modules on the power grid which are connected to the power connection points, such that voltages at the corresponding power connection points are consistent for the plurality of reused sub modules.

In an embodiment, the plurality of reused sub modules have identical internal structures and identical interfaces; and in another embodiment, the plurality of reused sub modules have identical external interfaces, but their internal structures may vary.

In an embodiment, step S401 comprises: determining a standard number and standard locations of power connection points of the reused sub modules; adjusting the number and locations of the power connection points of the plurality of reused sub modules to the determined standard number and standard locations of the power connection points. There may be many methods to determine the standard number and standard locations. For example, the number and locations of power connection points of a reused sub module selected from the plurality of reused sub modules can be taken as the standard number and the standard locations and the number and locations of power connection points of other reused sub modules can be adjusted to the standard number and the standard locations. The selected reused sub module is preferably a sub module with the least number of power connection points among respective reused sub modules. the number of power connection points of this sub module is the standard number, and the standard locations are also the locations of the power connection points of this sub module having the least power connection points; in another embodiment, the standard number is determined by an average value of the numbers of power connection points in all reused sub modules, while the standard locations may be determined by dividing each side length of the reused sub modules in average based on the standard number such that the power connection points are evenly distributed at sides of respective reused modules. After the standard number and standard locations are defined, an adjustment may be done by a power-planning tool to re-wind the power-bussing tool, or manually by the designer.

In another embodiment, the adjustment at step S401 is an abstract adjustment. After the number and locations of power connection points of a reused sub module are determined, physical information on the power connection points is extracted and directly applied to a plurality of reused sub modules at other locations, and then the power-bussing is rewound by a power-planning tool, or power connections of the power grid are planned by the designer manually.

In another embodiment, step S402 comprises: determining target voltages of respective power connection points of reused sub modules; adjusting power wires of the plurality of reused sub modules on a power grid which are connected to the power connection points, such that the voltage value of each power connection point reaches the target voltage of the power connection point.

In this embodiment, voltages of respective power connection points of reused sub modules may be determined by using an EDA tool. The existing EDA tool, for example Alsim of IBM corporation, CeltIC of Cadance corporation, or Prime Rail of Synopsys corporation can each provide such a function. When voltages of respective power connection points of respective reused sub modules are obtained, the target voltage of each power connection point may be determined by a plurality of methods. For example, an average voltage of the power connection point in all reused sub modules may be used as the target voltage, or an average voltage of the power connection point in a part of reused sub modules is taken as a target voltage, or a maximum value, a minimum value or a mean value of voltage of the power connection point in all reused sub modules is selected, etc. Generally speaking, the target voltage of the power connection point may be adjusted within a certain range as required. The design tool may reserve an adjustment interface for a user.

In an embodiment, power wires between the respective power connection points on power rings of the plurality of reused sub modules and the power grid are adjusted, such that voltage values on respective power connection points may reach the target voltage of the power connection point by: determining a width of an adjustable power wire segment connected to at least one power connection point based on distribution of power grid surrounding the plurality of reused modules; adjusting a length of the adjustable power wire segment connected to the at least one power connection point such that the voltage value on the at least one power connection point reaches its target voltage. Since a power supply voltage of one of the power connection points may already be the target voltage, only the required power wires connected to the power connection point are needed for adjustment.

In another embodiment, power wires between the respective power connection points on power rings of the plurality of reused sub modules and the power grid are adjusted, such that voltage value on each power connection point may reach a target voltage of the power connection point by: determining a length of an adjustable power wire segment connected to at least one power connection point based on distribution of the power grid surrounding the plurality of reused modules; adjusting a width of the adjustable power wire segment connected to at least one power connection point such that voltage value on the at least one power connection point reaches its target voltage. Likewise, since a power supply voltage of one of the power connection points may already be the target voltage, only the required power wires connected to the power connection points are needed for adjustment. Moreover, once the length of a power wire to be adjusted is determined, it will not be changed. In a preferred embodiment, this length is preferably the length of the shortest power wire in the power grid to which the power connection point is connected in respective reused sub modules. It is because when the number and locations of the power connection points of all reused sub modules have become consistent, each power connection point has the same start point with respect to the reused sub modules' own locations. Then, there is a shortest power wire in length from the start point of each power connection point to an edge of other module, an edge of a chip, or some border which forbids winding wire. Selection of the shortest length as an adjusted power wire length may guarantee that each power connection point has a sufficiently adjustable power wire. Hereinafter, implementation of this solution will be described in detail.

FIG. 5 illustrates a curve of a relationship between a width of each power wire segment connected to each power connection point and a voltage of the power connection point, wherein this curve is an approximate curve and indicates a change trend. Based on the curve of FIG. 5, the width adjustment of each power wire segment may be implemented by a plurality of methods such as an estimation method or a multi-iteration method.

In an embodiment of the estimation method, based on the curve as illustrated in FIG. 5, the voltage and power wire width may be approximated to be a first order linear relationship or a second order linear relationship in a relatively short area. For example, by using a first order linear function to estimate a power wire width required by adjusting to the target voltage value, the power wire width estimation value W may be obtained as:

$$W = W_0 \left( \frac{V_T - V_{min}}{V_0 - V_{min}} \right). \tag{1}$$

Wherein, $W_0$ indicates an initial width of each power wire segment to be adjusted before adjusting voltages of power connection points.

$V_0$ indicates a voltage value of each power connection point as calculated before adjusting the voltages of power connection points.

$V_{min}$ indicates a minimum voltage value that can be reached by a power connection point in theory, and which varies with different technology.

$V_T$ indicates a target voltage value of each power connection point. Namely, it is required to adjust voltage values of all reused sub modules at this power connection point to be this value.

Besides the first order estimation algorithm, some sampling points may also be obtained by adjusting the power wire width, and then a functional curve for an approximate voltage and power wire width is fitted by using a least square approximation, quadratic curve, or other curve, to estimate a width to which the power wire should be adjusted for satisfying the target voltage. These estimation methods are advantageously simple but have a drawback of being not accurate enough.

If the EDA tool may conveniently calculate a voltage value on an adjusted power connection point, a multi-iteration method may be used to obtain a width to which the power wire should be adjusted or to improve the accuracy of the estimated width. In the multi-iteration method, it is based on a curve relationship between a width of each power wire segment connected to each power connection point and a voltage of the power connection point in FIG. 5, which relationship is established on the basis that other parameters (for example, the length and the metal layer) for the power wire segment do not change. Because of the approximate direct proportional relationship between the wire width and the voltage (the theoretical basis for this relationship comes from two aspects: first, the wire width and wire resistance are in a direct proportion relationship, while the resistance and the voltage are in a direct proportion relationship; second, a plenty of experiment data also supports this theory). Suppose $V_{min}$ is a point of the voltage of FIG. 5 near the wire width curve which changes linearly within a certain area. When it is required to adjust the voltage from $V_{i-1}$ to $V_T$, the width to which the power wire needs to be adjusted are obtained based on a geometric relationship as follows:

$$W_i = W_{i-1}\left(\frac{V_T - V_{min}}{V_{i-1} - V_{min}}\right) \quad (2)$$

Wherein, the meanings of respective variants are specified below:

$W_i$ indicating a width of a power wire of each power connection point in the above-mentioned area with a certain length upon the ith iteration, and $W_0$ indicates an initial width of each power wire segment to be adjusted before voltage adjustment.

$V_{,i}$: indicating a voltage of each power connection point during the ith iteration; $V_0$ indicating a voltage value of each power connection point as automatically calculated by the EDA tool before voltage adjustment.

: indicating a minimum voltage value which can be reached by a power connection point in theory, wherein this theoretical value varies with different technology.

: indicating a target voltage value of each power connection point. In other words, it is required to adjust the voltage values of all reused sub modules at this connection point to be this value.

Formula (2) is a first order estimation formula for calculating a power wire width for next iteration in the iteration method; likewise, the above estimation method may also be used to obtain a second order estimation formula for calculating the power wire width for the next iteration, which will not be detailed here.

Figure 6:
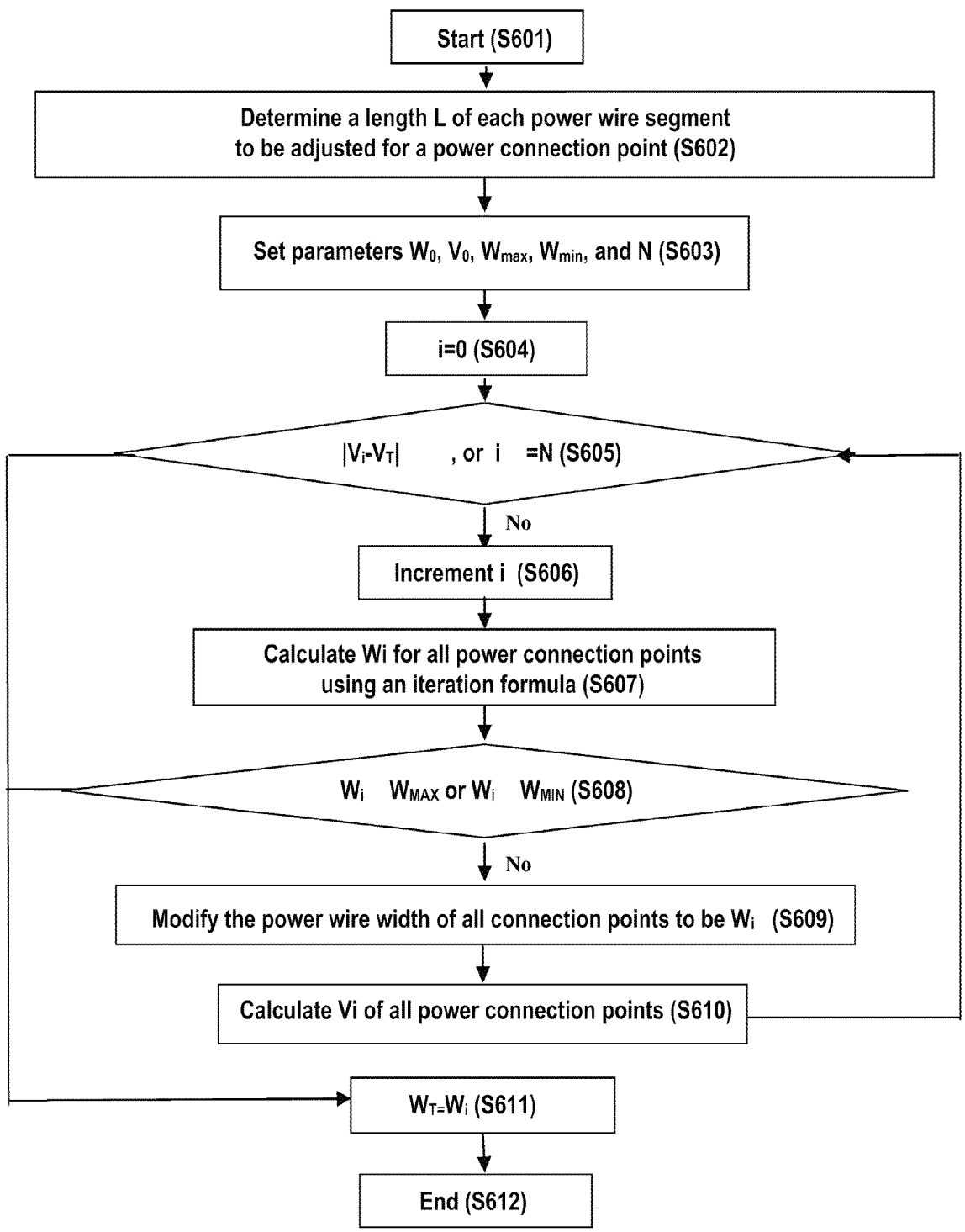
FIG. 6 schematically illustrates a flow of a multi-iteration method.

FIG. 6 schematically illustrates a flow of a multi-iteration method, wherein the target voltage value $V_T$ of each power connection point indicates an average voltage of voltage values of this connection point in all reused sub modules, and this selection is to enable a faster algorithm convergence.

According to FIG. 6, at step S601, the iteration flow starts.

At step S602, a length of a power wire connected to each power connection point to be adjusted is determined. For the sake of the convenience, preferably, the length of each power segment to be adjusted for each reused sub module is identical, and with the power connection point as an endpoint, the other endpoint is determined based on the determined length. This length is preferably the length of a shortest power wire to which the connection point is connected in respective reused modules, thereby guaranteeing the sure presence of the adjusted power wire in the algorithm.

At step S603, the allowed maximum width $W_{max}$ and minimum width $W_{min}$ of the power wire segment, the upper limit N of the iteration times, the initial voltage value $V_0$ of each power connection point before voltage adjustment, and the initial width $W_0$ of the power wire to which the power connection point is connected are determined. $W_{max}$ indicates a set upper limit which should not be exceeded for a width of an adjusted power wire, and $W_{min}$ indicates a set lower limit which should not be exceeded for a width of an adjusted power wire. The two values are generally determined by process parameters and some actual conditions, and width thresholds for different metal layers are also different. Because the power wire to be adjusted cannot be widened or narrowed without limitation, the optimization process will end if the algorithm reaches the two values. Setting of the upper limit N for iteration times is to guarantee that the algorithm will not exceed the running time without limitation due to a indefinite convergence, and when the iteration times reaches this value, the algorithm will end. Here, steps S602 and S603 have no time sequence, i.e., they may be implemented in any arbitrary sequence.

Within the prescribed range of iteration times and within the prescribed range of power wire width, based on the width of the current power wire, the voltage of the current corresponding power connection point, the theoretical minimum voltage value which can be reached by the power connection point, and the target voltage value of each power connection point, the iteration process calculates a width of the power wire in the next iteration and calculates a voltage of the corresponding power connection point in the next iteration. If a difference between the voltage of the corresponding power connection point in the next iteration and the target voltage value of the power connection point is within a prescribed range, then the width of the power wire in the next iteration is the adjusted width of the power wire of the power connection point. Specifically, the iteration comprises the following steps:

At step S604, the initial value of the iteration times is set to 0, where the iteration process starts.

Next, the process enters an iteration loop. During each iteration process, firstly at step S605, for a power connection point, it is determined whether a difference between a target voltage $V_i$ of the power connection point generated during each iteration and a target voltage $V_T$ of the power connection point has been less than a predetermined difference δ, or whether the iteration times has reached a predetermined maximum allowed times N. Setting of δ is also for guaranteeing that the algorithm will not exceed the running time without limitation because of failure to converge, but that the flow ends within an acceptable range. This parameter may dramatically facilitate the timing convergence process, while $V_i$ will gradually approach to $V_T$ during the iteration process. Thus, if it has been within an acceptable range or the iteration times has reached the predetermined maximum allowed times N, then the iteration ends, and the process enters into step S611, otherwise the iteration proceeds to step S606.

If the iteration ends, at step S611, a current wire width, i.e., a final width of the adjusted power wire segment is determined. Then, at step S612, this flow ends.

If the iteration continues, then at step S606, the number of iteration occurrences is plus 1.

Then, at step S607, according to the first order or second order iteration formula, the currently adjusted power wire width for all power wires to which the power connection point is connected is calculated; then at step S608, it is determined whether this width is within an allowed range, in other words, whether this width is less than $W_{max}$ but greater than $W_{min}$. If the width is beyond the range, then the iteration ends at step S611, otherwise enters step S609.

At step S609, the width of the power wire connected to the corresponding power connection point in all reused sub modules is adjusted to be $W_i$; preferably, next, a physical shape of the power wire segment is adjusted based on the target wire width by using an EDA tool or manually. Then at step S610, $V_i$ of the power connection point is calculated by using the EDA tool; then the flow enters into step S605, wherein for the power connection point, it is determined whether a difference between the target voltage $V_i$ of the power connection point generated during each iteration and the target voltage $V_T$ of the power connection point has been less than a predetermined difference δ, or whether the iteration times has reached a predetermined maximum allowed times N. The iteration continues till a suitable power wire width is obtained.

The power supply voltage $V_i$ of the power connection point is automatically calculated by the EDA tool, and the remaining steps are all implemented by an algorithm directly provided by a script code. However, these may be integrated to an EDA tool as a function thereof.

Figure 7:
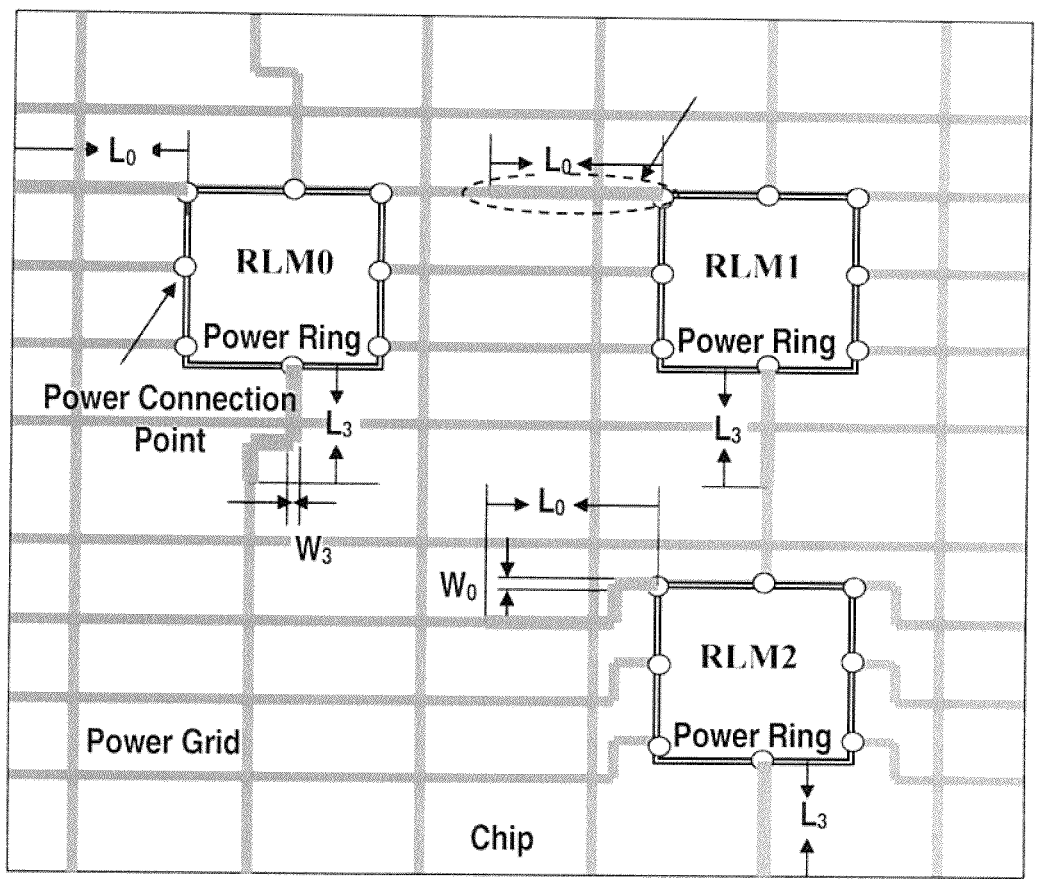
FIG. 7 illustrates a diagram of an adjusted power grid of FIG. 1.

FIG. 7 illustrates a diagram of an adjusted power grid of FIG. 1. It is seen from FIG. 7 that the adjusted widths of power wires connected to a same connection point for different sub modules are different.

Figure 8:
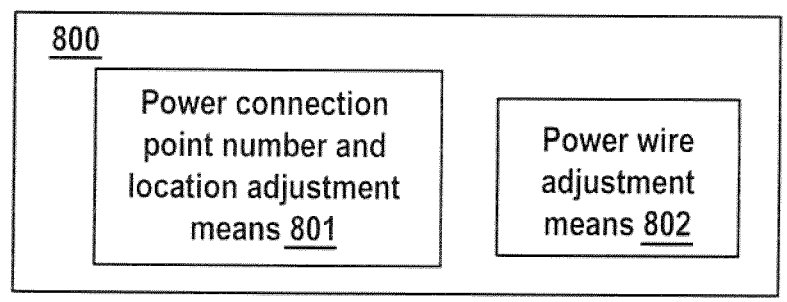
FIG. 8 further schematically illustrates a structural block of a system 800 for making voltage environment consistent for reused sub modules in chip design according to an embodiment of the present invention.

Within a same inventive concept, FIG. 8 further schematically illustrates a structural block diagram of a system 800 for making voltage environment consistent for reused sub modules in chip design according to an embodiment of the present invention, wherein the chip comprises a plurality of reused sub modules, each reused sub module being connected to a power grid of the chip through a power connection point on a power ring of the reused sub module, the system comprising: power supply connection point number and location adjustment means 801 for adjusting numbers and locations of power connection points, for adjusting the number and locations of power connection points of the plurality of reused sub modules, such that the numbers of the power connection points and the locations of the corresponding power connection points are identical for the plurality of reused sub modules; and power wire adjustment means 802 for adjusting power wires of the plurality of reused sub modules in the power grid which are connected to the power connection points, such that voltages at the corresponding power connection points for the plurality of reused sub modules are consistent.

In an embodiment of the present invention, the power supply connection point number and location adjustment means 801 for adjusting the number and locations of power connection points further includes (not illustrated in FIG. 8): determination means, for determining a standard number and standard locations of power connection points of reused sub modules; wherein the means for adjusting the number and locations of power connection points adjusts the number and locations of power connection points of the plurality of reused sub modules to the determined standard number and standard locations of the power connection points. The standard number and standard locations of power connection points are one of the following: the standard number being an average value of the numbers of power connection points in all reused sub modules, while the standard locations may be determined by dividing each side length of the reused sub modules in average based on the standard number such that the power connection points are evenly distributed at sides of respective reused modules; the number and locations of power connection points of a reused sub module selected from the plurality of reused sub modules being taken as the standard number and standard locations.

In an embodiment, the power wire adjustment means 802 further comprises (not illustrated in FIG. 8): target voltage determination means for determining a target voltage of each power connection point of a reused sub module; wherein the power wire adjustment means adjusts power wires of the plurality of reused sub modules in the power grid which are connected to the power connection point, such that the voltage value on each power connection point reaches the target voltage of the power connection point. Herein, the target voltage of the power connection point may be adjusted within a range as required. For example, the target voltage may be one of an average voltage of the power connection point in all reused sub modules; an average voltage of the power connection point in a part of reused sub modules; a maximum value of the voltages of the power connection point in all reused sub module, a minimum value of the voltages of the power connection point in all reused sub modules, or a mean value of voltages of the power connection point in all reused sub modules.

In an embodiment, the power wire adjustment means 802 further comprises (not illustrated in FIG. 8): power wire width determination means for determining a width of an adjustable power wire segment connected to at least one power connection point based on distribution of the power grid surrounding the plurality of reused sub modules; and power wire length adjustment means for adjusting a length of an adjustable power wire segment connected to the at least one power connection point, such that the voltage value at the at least one power connection point reaches its target voltage.

In another embodiment, the power wire adjustment means 802 further comprises (not illustrated in FIG. 8): power wire length determination means for determining a length of an adjustable power wire segment connected to at least one power connection point based on distribution of the power grid surrounding the plurality of reused sub modules; and power wire width adjusting means for adjusting a width of an adjustable power wire segment connected to the at least one power connection point, such that the voltage value at the at least one power connection point reaches its target voltage, wherein the length of the adjustable power wire segment for the power wire width adjusting means is a length of a shortest power wire in the power grid to which the power connection point is connected in respective reused sub modules.

Here, the power wire adjustment means 802 may adjust a width of a power wire in many manners. In an embodiment, the power wire width adjusting means is implemented by estimating an adjusted width of each power wire segment, based on a target voltage at the power connection point, an initial width of each power wire to be adjusted before adjusting the voltage of the power connection point, a voltage value of the power connection point calculated before adjusting the voltage of the power connection point, and a minimum voltage value which can be reached by the power connection point in theory. In another embodiment, the power wire width adjusting means is implemented by obtaining an adjusted width of each power wire segment through an iteration process, wherein, based on the width of a current power wire, a current voltage of the corresponding power connection point, the minimum voltage value that can be reached by the power connection point in theory, and a target voltage value of each power connection point, the iteration process calculates a width of the power wire in the next iteration and calculates a voltage of a corresponding power connection point in the next iteration. If a difference between the voltage of the corresponding power connection point in the next iteration and the target voltage value of the power connection point is within a prescribed range, then the width of the power wire in the next iteration is the adjusted width of the power wire of the power connection point. The specific iteration process has been described in detail in the method, which will not be detailed here.

Within the same inventive concept, the present invention further provides a design structure embodied in a computer-readable medium for designing, manufacturing, or testing an integrated circuit, wherein the design structure is designed using one of the above methods. The design structure comprises a netlist. This design structure is stored on a memory medium in a data format for exchanging layout data of an integrated circuit. The design structure at least comprises one of testing data, feature calibration data, validation data, or design instruction.

Figure 9:
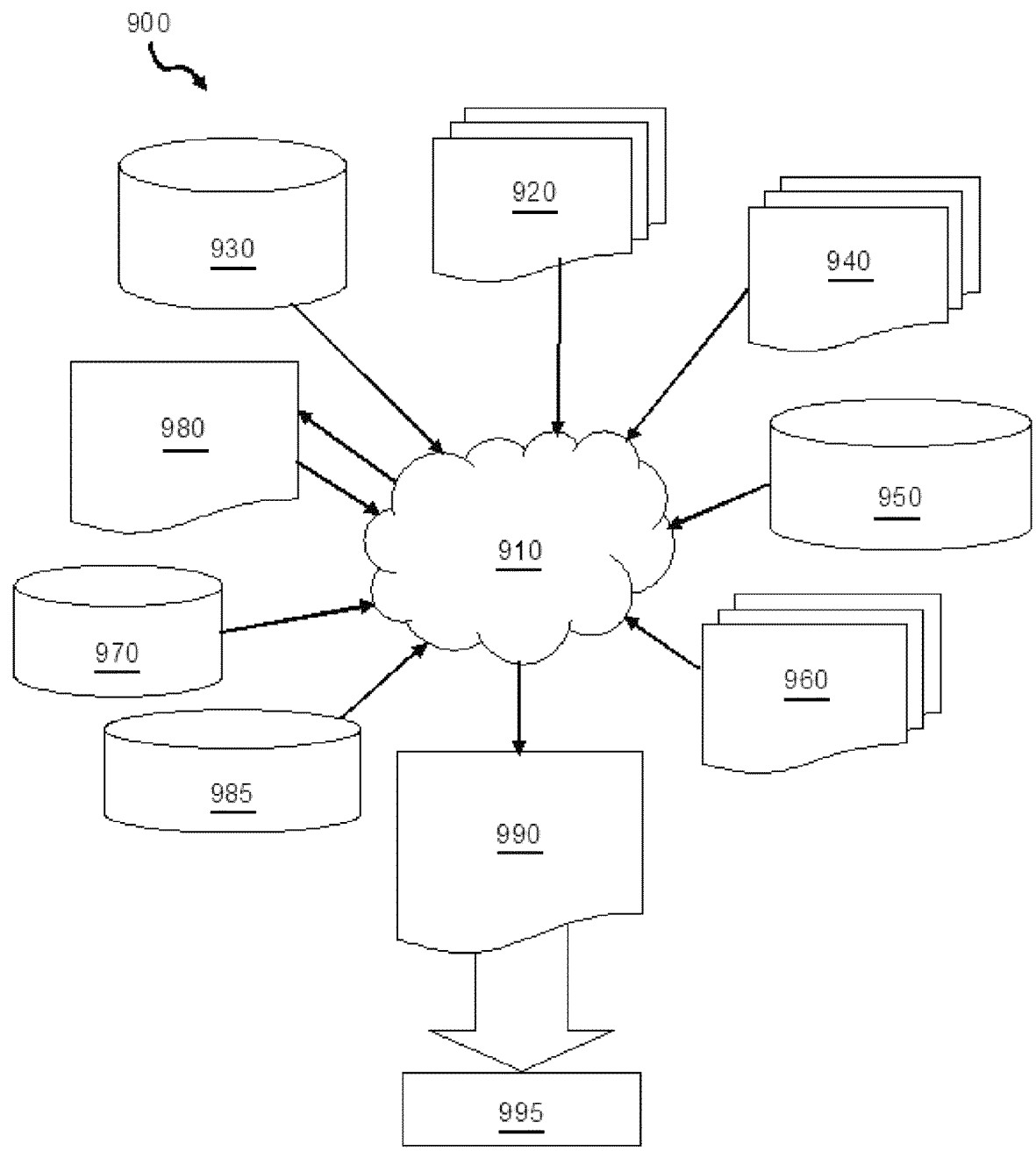
FIG. 9 illustrates a block diagram of a typical design flow 900 for use for example in semiconductor designing, manufacturing and/or testing.

FIG. 9 illustrates a block diagram of a typical design flow 900 for use for example in semiconductor designing, manufacturing and/or testing. The design flow 900 may vary with a type of a designed IC. For example, a design flow 900 for constructing a special purpose integrated circuit may be different from a design flow 900 for designing a standard element. A design structure 920 is preferably an input of design process 910 and may come from an IP provider, a core provider, or other design company, or generated by an operator of a design flow, or from other source. The design structure 920 comprises the embodiment of the present invention as illustrated in FIG. 7 in a circuit diagram or HDL (hardware description language, for example Verilog, VHDL, C, etc.). The design structure 920 may be embodied in one or more machine readable media. For example, the design structure 920 may be a textual document expression or a graphical expression of the embodiment of the present invention as illustrated in FIG. 7. Preferably, the process 910 preferably synthesizes (or converts) the embodiment of the present invention as illustrated in FIG. 7 to a netlist 980 which, here, is a list of for example, links, transistors, logic gates, control circuits, I/O, module, etc, depicts a connection of other element to a circuit in an integrated circuit design and is recorded on at least one machine readable medium. It may be a repetitive process. Based on the design specification and parameters of the circuit, the netlist 980 may be re-synthesized once or multiple times.

The design process 910 may comprise various kinds of inputs, for example, inputs from a warehouse element 930 which may accommodate a set of commonly used elements, circuits, and means and comprise modules, layouts, and symbol expressions, for a given manufacturing technology (for example, different technical nodes, 32 nm, 45 nm, and 90 nm, etc.); inputs from the design speciation 940, input from the feature calibration data 950, input from validation data 960, input from the design rule 970, and inputs from a testing data document 985 (which may comprise testing mode and other testing information). The design process 910 may further comprise, for example a standard circuit design process such as timing analysis, validation, design rule check, layout, and wiring operation, etc. Without departing from the spirit and scope of the present invention, a person of normal skill in the art of integrated circuit design may understand the scope of possible electronic design automation tool and application used in the design process 910. The design structure of the present invention is not limited to any particular design flow.

The design process 910 preferably converts the embodiment of the present invention as illustrated in FIG. 7 and any additional integrated circuit design or data (if applicable) to a second design structure 990. The design structure 990 is stored on a memory medium in a data format (for example GDSII (GDS 2), GL 1, and OASIS, or information about storing this design structure in any other suitable format) for layout data exchange of an integrated circuit. The design structure 990 may comprise, for example, testing data document, design content document, manufacturing data, layout parameter, wiring, metal level, via, shape, data for addressing through a production line, or any other data required by a semiconductor manufacturer to produce the embodiment of the present invention as illustrated in FIG. 7. Then, the design structure 990 may proceed to step 995, where the design structure 990, for example, is subject to tapeout, delivered for manufacturing, delivered to the mask workshop, delivered to another design workshop, returned to the client, etc.

Though the exemplary embodiments of the present invention are described herein with reference to the drawings, it should be understood that the present invention is not limited to these accurate embodiments, and a person of normal skill in the art can make various modifications to the embodiments without departing from the scope and principle of the present invention. All such variations and modifications are intended to be included in the scope of the present invention as defined in the appended claims.

Moreover, based on the above description, the skilled in the art would appreciate that the present invention may be embodied in an apparatus, a method, or a computer program product. Thus, the present invention may be specifically implemented in the following manners, namely, complete hardware, complete software (including firmware, resident software, microcode, etc), or a combination of software part and hardware part as generally called "circuit," "module," or "system" in this text. Further, the present invention may also adopt a form of computer program product as embodied in any tangible medium of expression, the medium comprising computer-usable program code.

Any combination of one or more computer-usable or computer-readable mediums may be used. The computer-usable or computer-readable medium may be for example, but not limited to, electrical, magnetic, optical, electromagnetic, infrared, or semiconductor system, means, device, or propagation medium. More specific examples (non-exhaustive list) of the computer-readable medium comprise: an electric connection having one or more leads, a portable computer magnetic disk, hard disk, random access memory (RAM), read-only memory (ROM), erasable programmable read-only memory (EPROM or flash disk), optical fiber, portable compact disk read-only memory (CD-ROM), optical storage device, a transmission medium for example supporting internet or intranet, or a magnetic storage device. It should be noted that the computer-usable or computer readable medium may even be a paper printed with a program thereon or other suitable medium, because the program may be obtained electronically by electrically scanning such paper or other medium, and then compiled, interpreted or processed in a suitable manner, and if necessary, stored in a computer memory. In the context of the present document, a computer-usable or computer-readable medium may be any medium containing, storing, communicating, propagating, or transmitting a program available for an instruction execution system, apparatus or device, or associated with the instruction execution system, apparatus, or device. A computer-usable medium may comprise a data signal contained in a base band or propagated as a part of carrier and embodying a computer-usable program code. A computer-usable program code may be transmitted by any suitable medium, including, but not limited to, radio, wire, cable, or RF, etc.

A computer program code for executing operations of the present invention may be written by any combination of one or more program design languages, the program design languages including object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, including local area network (LAN) or wide area network (WAN), or connected to external computer (for example by means of an internet service provider via Internet).

Further, each block in the flow charts and/or block diagrams of the present invention and combination of respective blocks therein may be implemented by computer program instructions. These computer program instructions may be provided to a processor of a general purpose computer, a dedicated computer or other programmable data processing apparatus, thereby generating a machine such that these instructions executed through the computer or other programmable data processing apparatus generate means for implementing functions/operations prescribed in the blocks of the flow charts and/or block diagrams.

These computer program instructions may also be stored in a computer-readable storage medium capable of instructing the computer or other programmable data processing apparatus to work in a particular manner, such that the instructions stored in the computer-readable medium generate a product including instruction means for implementing the functions/operations prescribed in the flow charts and/or block diagrams.

The computer program instructions may also be loaded on a computer or other programmable data processing apparatus, such that a series of operation steps are implemented on the computer or other programmable data processing apparatus, to generate a computer-implemented process, such that execution of the instructions on the computer or other programmable apparatus provides a process of implementing the functions/operations prescribed in the blocks of the flow charts and/or block diagrams.

The flowcharts and block diagram in the drawings illustrate the system, methods, as well as architecture, functions and operations which are possibly implemented by a computer program product according to the embodiments of the present invention. In this regard, each block in the flowcharts or block may represent a module, a program segment, or a part of code, which contains one or more executable instructions for performing specified logic functions. It should be also noted that in some alternative implementations, functions indicated in blocks may occur in an order differing from the order as illustrated in the figures. For example, two blocks illustrated consecutively may be performed in parallel substantially, and sometimes they can be performed in an inverse order. This depends on relevant functions. It should also be noted that each block in the block diagrams and/or flowcharts and a combination of blocks in the block diagrams and/or flowcharts may be implemented by a dedicated hardware-based system for performing specified functions or operations or by a combination of dedicated hardware and computer instructions.

What is claimed is:

1. A method for making voltage environment consistent for reused sub modules in designing a chip, wherein the chip comprises a plurality of reused sub modules, each reused sub module being connected to a power grid of the chip through power connection points on a power ring thereof, the method comprising:
   adjusting numbers and locations of power connection points of the plurality of reused sub modules, such that the numbers of the power connection points and the locations of the corresponding power connection points are identical for the plurality of reused sub modules;
   adjusting power wires of the plurality of reused sub modules on the power grid, which are connected to the power connection points, such that voltages at the corresponding power connection points are consistent for the plurality of reused sub modules; and
   producing said chip with consistent voltage environment for the plurality of reused sub modules.

2. The method according to claim 1, wherein the adjusting numbers and locations of power connection points of the plurality of reused sub modules such that the numbers of the power connection points and the locations of the corresponding power connection points are identical for the plurality of reused sub modules comprises:
   determining a standard number and standard locations of power connection points of a reused sub module; and
   adjusting the numbers and locations of power connection points of the plurality of reused sub modules to the determined standard number and standard locations of power connection points.

3. The method according to claim 2, wherein the standard number and standard locations of the power connection points are one of the following:
   the standard number being an average value of the numbers of power connection points in all reused sub modules, the standard locations being determined by dividing each side length of the reused sub modules in average based on the standard number such that the power connection points are evenly distributed on sides of respective reused modules; and
   the number and locations of power connection points of one of the plurality of reused sub modules being selected as the standard number and standard locations.

4. The method according to claim 1, wherein the adjusting the power wires of the plurality of reused sub modules on the power grid which are connected to the power connection points such that voltages at the corresponding power connection points are consistent for the plurality of reused sub modules comprises:
   determining a target voltage for each power connection point of a reused sub module; and adjusting the power wires of the plurality of reused sub modules on the power grid which are connected to the power connection points such that the voltage value at each power connection point reaches the target voltage of the power connection point.

5. The method according to claim 4, wherein the target voltage of the power connection point may be adjusted within a certain range as required.

6. The method according to claim 4, wherein the adjusting the power wires of the plurality of reused sub modules on the power grid which are connected to the power connection points such that the voltage value of each power connection point reaches the target voltage of the power connection point comprises:

determining a width of an adjustable power wire segment connected to at least one power connection point based on distribution of the power grid surrounding the plurality of reused sub modules; and adjusting a length of the adjustable power wire segment connected to the at least one power connection point such that a voltage value at the at least one power connection point reaches its target voltage.

7. The method according to claim 4, wherein the adjusting the power wires of the plurality of reused sub modules on the power grid which are connected to the power connection points such that the voltage value of each power connection point reaches the target voltage of the power connection point comprises:

determining a length of an adjustable power wire segment connected to at least one power connection point based on distribution of the power grid surrounding the plurality of reused sub modules; and adjusting a width of the adjustable power wire segment connected to the at least one power connection point such that the voltage value at the at least one power connection point reaches its target voltage.

8. The method according to claim 7, wherein the length of the adjustable power wire segment is a length of a shortest power wire in the power grid to which power connection points are connected in respective reused sub modules.

9. The method according to claim 7, wherein the adjusting the width of the adjustable power wire segment connected to the at least one power connection point such that the voltage value at the at least one power connection point reaches its target voltage is implemented by estimating an adjusted width of each power wire segment, based on the target voltage at the power connection point, an initial width of each power wire to be adjusted before adjusting the voltage of the power connection point, a voltage value of the power connection point as calculated before adjusting the voltage of the power connection point, and a minimum voltage value that the power connection point can reach.

10. The method according to claim 7, wherein the adjusting the width of the adjustable power wire segment connected to the at least one power connection point such that the voltage value at the at least one power connection point reaches its target voltage is implemented by obtaining an adjusted width of each power wire segment through an iteration process, wherein, based on the width of a current power wire, a current voltage of a corresponding power connection point, a minimum voltage value that the power connection point can reach, and the target voltage value of each power connection point, the iteration process calculates a width of the power wire in the next iteration and calculates a voltage of the corresponding power connection point in the next iteration, wherein if a difference between the voltage of the corresponding power connection point in the next iteration and the target voltage value of the power connection point is within a prescribed range, then the width of the power wire in the next iteration is the adjusted width of the power wire for the power connection point.

11. A design structure embodied in a non-transitory computer readable storage medium, which when being executed by a computer implements a method for designing, manufacturing or testing an integrated circuit according to claim 1.

12. The design structure according to claim 11, further comprising a netlist.

13. The design structure according to claim 11, wherein the design structure is stored on said non-transitory computer readable storage medium in a data format for exchanging layout data of said integrated circuit.

14. The design structure according to claim 11, wherein the design structure comprises at least one of testing data, feature calibration data, validation data and design specification.

15. A system for making voltage environment consistent for reused sub modules in designing a chip, wherein the chip comprises a plurality of reused sub modules, each reused sub module being connected to a power grid of the chip through power supply connection points on a power ring thereof, the system comprising:

power supply connection point number and location adjustment means for adjusting numbers and locations of power supply connection points of the plurality of reused sub modules, such that the numbers of the power supply connection points and the locations of the corresponding power supply connection points are identical for the plurality of reused sub modules; and power wire adjustment means for adjusting power wires of the plurality of reused sub modules on the power grid, which are connected to the power supply connection points, such that voltages on the corresponding power supply connection points are consistent for the plurality of reused sub modules.

16. The system according to claim 15, wherein the power supply connection point number and location adjustment means further comprises:

determination means for determining a standard number and standard locations of power connection points of a reused sub module; and wherein the power supply connection point number and location adjustment means adjusts the numbers and locations of power connection points of the plurality of reused sub modules to the determined standard number and standard locations of power connection points.

17. The system according to claim 16, wherein the standard number and standard locations of the power connection points are one of:

the standard number being an average value of the number of power connection points in all reused sub modules, the standard locations being determined by dividing each side length of the reused sub modules in average based on the standard number such that the power connection points are evenly distributed on sides of respective reused modules; and the number and locations of power connection points of one of the plurality of reused sub modules being selected as the standard number and standard locations.

18. The system according to claim 15, wherein the power wire adjustment means further comprises:

target voltage determination means for determining a target voltage for each power connection point of a reused sub module;

wherein the power wire adjustment means adjusts the power wires of the plurality of reused sub modules on the power grid which are connected to the power supply connection points such that the voltage value at each power connection point reaches the target voltage of the power connection point.

19. The system according to claim 18, wherein the power wire adjustment means further comprises:
- power wire length determination means for determining a length of an adjustable power wire segment connected to at least one power connection point based on distribution of the power grid surrounding the plurality of reused sub modules; and
- power wire width adjusting means for adjusting a width of the adjustable power wire segment connected to the at least one power connection point such that a voltage value at the at least one power connection point reaches its target voltage.

20. The system according to claim 19, wherein the length of the adjustable power wire segment for the power wire width adjusting means is a length of a shortest power wire in the power grid to which power connection points are connected in respective reused sub modules.

21. The system according to claim 19, wherein the power wire width adjusting means is implemented by estimating an adjusted width of each power wire segment, based on the target voltage at the power connection point, an initial width of each power wire to be adjusted before adjusting the voltage of the power connection point, a voltage value of the power connection point as calculated before adjusting the voltage of the power connection point, and a minimum voltage value that the power connection point can reach.

22. The system according to claim 19, wherein the power wire width adjusting means is implemented by obtaining an adjusted width of each power wire segment through an iteration process, wherein, based on the width of a current power wire, a current voltage of a corresponding power connection point, a minimum voltage value that the power connection point can reach, and the target voltage value of each power connection point, the iteration process calculates a width of the power wire in the next iteration and calculates a voltage of the corresponding power connection point in the next iteration, wherein if a difference between the voltage of the corresponding power connection point in the next iteration and the target voltage value of the power connection point is within a prescribed range, then the width of the power wire in the next iteration is the adjusted width of the power wire for the power connection point.

23. The system according to claim 18, wherein the target voltage of the power connection point may be adjusted within a certain range as required.

24. The system according to claim 18, wherein the power wire adjustment means further comprises:
- power wire width determination means for determining a width of an adjustable power wire segment connected to at least one power connection point based on distribution of the power grid surrounding the plurality of reused sub modules; and
- power wire length adjustment means for adjusting a length of the adjustable power wire segment connected to the at least one power connection point such that a voltage value at the at least one power connection point reaches its target voltage.

* * * * *